Patented Oct. 9, 1945

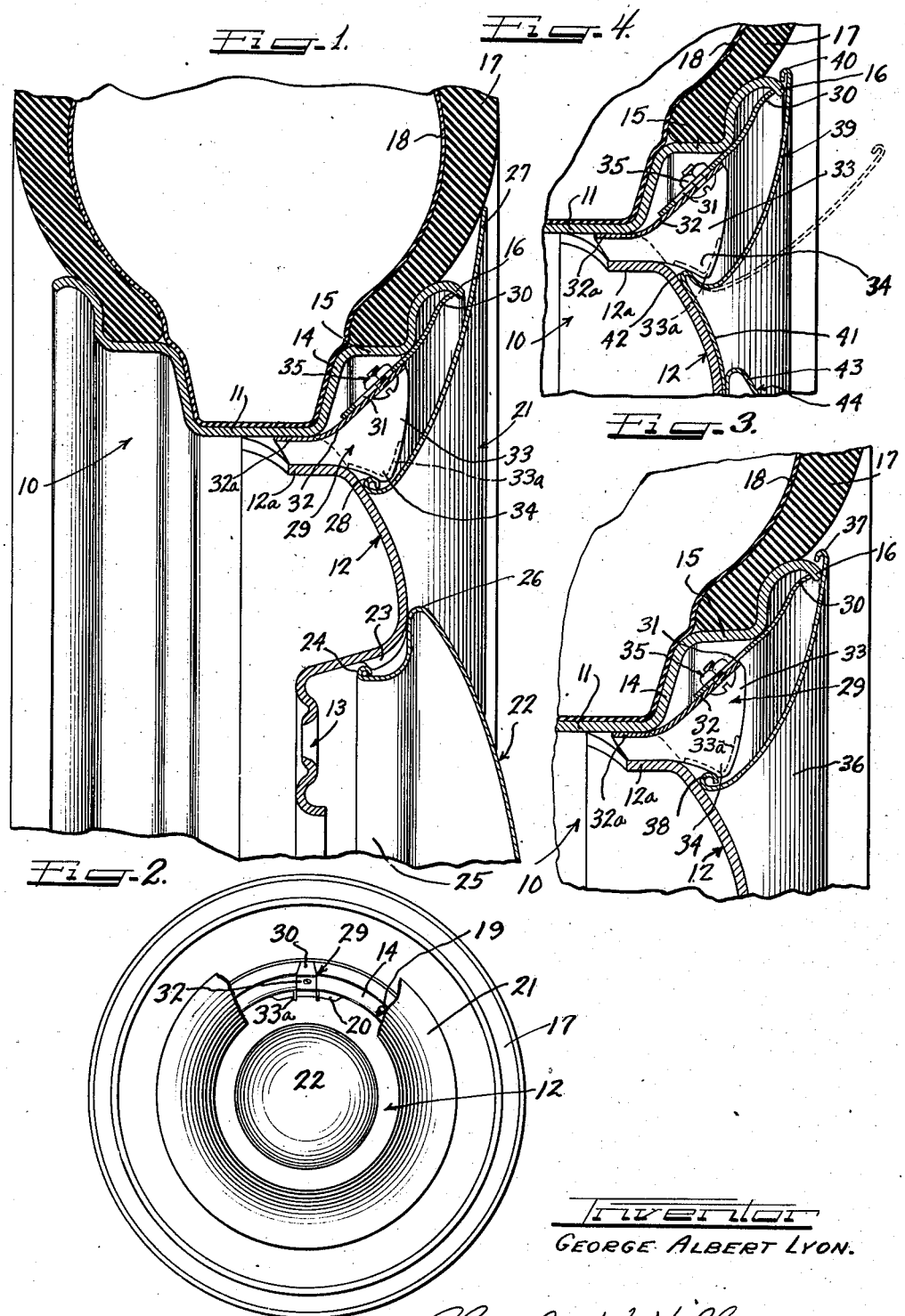

2,386,231

UNITED STATES PATENT OFFICE 2,386,231

WHEEL STRUCTURE

George Albert Lyon, Allenhurst, N. J.

Application April 23, 1943, Serial No. 484,137

3 Claims. (Cl. 41—10)

This invention relates to an improved wheel structure and is directed more particularly to an improved cover assembly therefor.

An important object of the invention is to provide for a wheel structure, improved retaining means for securing an ornamental cover on the outer side thereof in an improved manner.

Still another object of the invention is to provide improved retaining means which may be utilized to secure an ornamental cover to the outer side of wheel structures having varying dimensions.

A further object of the invention is to provide improved retaining means for securing a cover member over the outer side of a wheel structure and which may be easily and quickly accommodated for retaining engagement with a variety of wheel structures having different dimensions and configurations.

Still another object of the invention is to provide, for a wheel structure, an improved cover assembly including a resiliently flexible cover member which may be constructed from any suitable material giving it the foregoing characteristics, such as a synthetic plastic, rubber, either synthetic or natural, or a thin springy metal. The cover member being resiliently flexible away from the wheel structure over which it is disposed to render the rear side thereof accessible.

Still another object of the invention is to provide for a wheel structure a cover assembly including a cover member having the foregoing characteristics and which is so arranged as to obviate the imposition of unduly severe bending strains or stresses at any localized part of the cover member during the flexing thereof, thus obviating the development of fatigue and resulting breakage of the cover member after repeated bending operations.

Still a further object of the invention is to provide for a wheel structure, a cover member having the foregoing characteristics, the cover member being in the form of an annulus and being resiliently flexible away from the wheel structure over which it is disposed, at the outer periphery thereof to render the rear side thereof accessible, the cover member being retained on the wheel structure by retaining engagement of a radially inner part thereof and being further arranged so that the radially inner part may move entirely throughout the flexing movement of the remaining portion of the cover without engaging obstructing parts of the wheel structure or retaining means thereby to prevent the development of localized, severe bending strains at any part of the cover member.

It is a further object of the invention to provide for a wheel structure an improved retaining assembly which includes means having a part arranged to engage the tire rim of the wheel structure and a part arranged to engage a radially inwardly disposed part of the wheel structure, said means being adjustable as to the expanse thereof between the engaged wheel structure parts to accommodate wheel structures of varying dimensions.

Many other objects and advantages of the invention will become apparent from the following description and accompanying drawing in which:

Figure 1 is a fragmentary cross-sectional view of a wheel structure embodying my invention;

Figure 2 is a side elevational view of a wheel structure constructed in accordance with Figure 1 having a part thereof broken away for illustrative purposes;

Figure 3 is a fragmentary cross-sectional view of a wheel structure varying in dimensions from that shown in Figure 1 and showing the adjustment of the retaining means shown in Figure 1; and Figure 4 is a fragmentary cross-sectional view of a modified form of my invention.

It will be understood that the embodiment shown herein is for illustrative purposes only and may be changed or modified without departing from the spirit and scope of the invention as set forth in the appended claims.

As shown in the drawing the reference character 10 designates generally a multi-flange, drop center type of tire rim which is connected as by riveting or welding or the like through a base flange 11 to a central body part or spider 12 which includes a central bolt-on flange 13. The drop center rim 10 is further provided with opposite side flanges 14, opposite intermediate flanges 15 and opposite edge portions 16. A suitable tire 17 having an inner tube 18 is mounted upon the rim, one of the side walls 14, as shown in Figure 2, having an orifice through which the valve stem 19 may project. The spider 12 is provided with a radially outer flange 12a, which, as shown more clearly in Figure 2, has portions formed to be spaced from the radially inner surface of the flange 11 to provide circumferentially spaced apertures 20 along the junction of the tire rim and the body part 12.

In the embodiment shown herein the cover assembly includes an outer annular part 21 and a central hub cap simulating part 22. In order that the hub cap simulating part 22 may be detachably secured to the wheel structure in snap-on pry-off relationship, there is provided on the outer side of the wheel structure a plurality of bumps 23, the inner extremity of which define a circle having a diameter less than of a circle prescribed by the radially outer extremity of a peripheral bead 24 formed at the axially inner edge of a snap-on flange 25 of the hub cap member 22. The peripheral flange 25 together with the bead 24 thereof, being resilient, will spring axially inwardly at the circumferential part thereof engaged by the respective humps 23 when the hub cap member 22 is urged axially inwardly so that the bead 24 overrides the substantially axially outer face of the humps whereupon the bead, after passing the peak of the humps again expands to assume a position shown in Figure 1, wherein it rests against the substantially axially inner face of the respective humps 23 thus to draw the radially outer extremity 26 of the hub cap member tightly against the adjacent portion of the outer surface of the wheel structure.

While the retaining means of the present invention may be utilized with a wide variety of cover members, the annular cover member 21, shown herein, is formed from a material giving it resiliently, locally flexible characteristics such as a synthetic plastic, rubber, either synthetic or natural, or a thin springy metal having characteristics which enable the outer peripheral part of the cover member to be flexed substantially axially outwardly at the outer peripheral edge thereof, away from the wheel structure to render the rear side thereof accessible to provide for servicing of wheel balancing weights or for inflation of the tire. Since, with such a cover member, it is feasible to entirely cover the outer side of the tire rim 10 and any appurtenances which may be associated therewith, the cover member 21 may be provided with a cross-sectional configuration of such shape and magnitude that the outer peripheral part 27 thereof may extend radially outwardly of the edge portion 16 of the tire rim to overlie the junction between the rim and the tire 17 to conceal the same and to conceal a part of the side wall of the tire while the radially inner peripheral part thereof which as shown herein is formed as a reinforcing bead 28, may extend radially inwardly beyond the junction of the tire rim 10 and the body part 12 to overlie a radially outer portion thereof.

With such a construction it will be seen that the cover member 21 constitutes in effect a continuation of the side wall of the tire 17 to give the appearance of being a part of the same and to give the appearance of being the white side wall of a massive tire mounted upon a wheel structure of minimum dimension, if colored white. It will also be seen that with such a construction, the ornamental cover member which is adjacent the tire, instead of being formed to curve sharply axially inwardly toward the wheel structure, extends radially inwardly thereof with a very gradual curvature simulating that of the side wall of the tire, thus to augment the appearance of being a part of the tire. Furthermore the junction between the tire rim 10 and the body part 12 of the wheel structure is entirely concealed.

It will be understood that with a construction such as that shown in Figure 1 wherein the outer marginal portion 27 of the cover member 21 extends beyond the edge portion 16 of the tire rim, the cover member will be subjected to repeated and rapid lateral expansion and contraction of the tire by virtue of the repeated and rapid expansion and contraction thereof occurring as the wheel rotates under load bearing conditions over a hard surface. Under these conditions it will be seen that the cover member 21 is continuously subjected to bending stresses to accommodate the expansion of the tire, these bending stresses being additional to those imposed when the outer peripheral part 27 thereof is manipulated axially outwardly to admit the nozzle of an air hose or the like.

To the end that the cover member 21 may be secured to the wheel structure in such a manner that damaging effect of these bending stresses may be avoided by efficient distribution of the same to prevent the concentration of these bending stresses at localized area, there is provided herein improved retaining means for securing the cover to the wheel structure. As will be seen presently, the retaining means provided herein has the further advantage in that it may be regulated to efficiently cooperate with wheel structures of varying dimensions and thus may be considered as a universal retaining arrangement.

As best shown in Figure 1, the retaining means may comprise a plurality of clip members 29 arranged to cooperate with the circumferentially spaced apertures 20 of the wheel structure and the edge portion 16 of the tire rim 10. While the adjustable features of my invention are shown herein as utilized with individual clip members it will be understood that the features thereof may also be utilized in a retaining assembly which includes an annular retaining portion for engaging the cover.

In the present instance the retaining clips 29 each include an arm or finger 30 arranged to engage, in interlocking relationship, the radially inner surface of the edge portion 16 at the part thereof which is curled radially inwardly. These arms or fingers 30 also include at an intermediate part, a slot 31 adapted to receive a nut and bolt assembly which extends through an aperture of a bridging portion 32 which extends between a pair of radially inwardly extending cover engaging flanges 33. These flanges 33, and the backing member 32 are so formed as to interfit with the wheel structure by insertion into the circumferentially spaced apertures 20 at the junction of the tire rim 10 and the body part 12 thereof and includes radially inwardly extending hump parts 34 over which a cover member may be forced by a snap-on operation to be retained upon the wheel structure.

In applying the clips 29 to the wheel structure it will be seen that the cover retaining portion including the bridging member 32 and the flanges 33 may be properly inserted in the respective aperture 20 whereupon the nut and bolt arrangement 35 may be loosened so that the finger or arm 30 may be retracted or extended until the edge extremity thereof engages the edge portion 16 of the tire rim as shown in Figure 1, this movement being accomplished by virtue of the slot 31 in the respective finger 30. Thereafter the nut and bolt arrangement 35 may be tightened whereupon it will be seen that the retaining clips 29 will be securely maintained in bridging relationship between the edge portion 16 of the tire rim 10 and the junction of the tire rim and the wheel body part 12. If desired the length of the clip members 29 as determined in the foregoing manner may be increased slightly so that insertion thereof with the wheel structure may be accomplished by first interfitting the axially inner part 32a of the bridging member and the adjacent portion of the flanges 33 into the apertures 20 whereupon the outer end of the arm 30 may be snap-fitted about the radially inner extremity of the edge portion 16, into a position as shown in Figure 1. In any event it will be seen that tire rims of varying depth may be easily and quickly accommodated by the retaining members provided herein.

It will also be understood that while the retaining means 29 have been shown herein as associated with the apertures 20 in the wheel structure, the advantages of my invention may also be utilized in conjunction with wheel structures where these apertures are not available since the configuration of the axially inner portion of the flanges 33 may be varied to accommodate other types of junctions or abutments provided by various types of wheel structures.

In order that a smooth non-cutting edge may be presented by the flanges 33 and particularly the humps 34 thereof, to the wheel structure, the flanges 33 are provided with outwardly turned portions 33a so that a flat non-cutting surface will be engaged by the cover member.

The retaining members all having been inserted and fitted to the wheel structure in the foregoing manner, the elastically flexible cover member 21 is then placed against the axially outwardly disposed edges of the flanges 33 and pressed axially inwardly thereagainst whereupon the inner peripheral part thereof and the bead 28 thereof is urged elastically over the humps 34 of the flanges 33 and into lodged engagement with the axially inner part thereof, thus to be retained securely in snap-on pry-off engagement with the wheel structure.

In removing the cover 21 from the wheel structure the user may either reverse the aforementioned snap-on engagement of the cover member 21 with the retaining means or if desired, the cover 21 may be flexed resiliently outwardly away from the wheel to permit the insertion of a screw driver whereupon the nut and bolt arrangement 35 may be loosened to provide for collapse of the various retaining means so that they may be removed from the wheel structure. It will be understood of course that the retaining means shown herein may be adapted to the heretofore used cover assemblies in which axial outward flexing of the cover from the wheel structure is not contemplated. In this event the cover is removed by the aforementioned snap-on pry-off relationship between the cover and the retaining means.

From Figure 3, the relationship of the parts of the retaining members when applied to a wheel having a tire rim of greater radial depth will be clearly seen. In this construction the cover 36 is provided with a curled outer edge 37 disposed in the vicinity of the edge portion 16 while the bead 38 at the inner peripheral edge thereof is associated with the wheel structure and the retaining members in a manner similar to that of the bead 28 of the structure shown in Figure 1.

A further important aspect of my invention, particularly with relation to resiliently, outwardly flexible cover members is the efficient distribution of bending stresses normally imposed upon the cover member during flexure thereof so that concentrated, severe bending forces are not applied to localized parts of the cover member thus to cause fatigue and breakage of the same.

Broadly, this distribution of bending stresses occurring during outward flexure of the cover member is obtained by providing a retaining arrangement wherein a localized portion of the resiliently flexible cover is not brought into engagement or abutment with a part of the retaining means or a part of the wheel structure or into engagement with any other relatively immovable structure during the entire range of the desired flexing movement of the cover member. It will be understood that if, part way through the flexing action, some portion of the cover member abuts a part of the retaining means or a part of the wheel structure, continued movement of the cover will cause the part which is engaged to curl around the obstacle, thus providing localized, severe bending strains which tend to fatigue the material from which the cover member is constructed whereby breakage occurs after a period of use.

In the structures of Figures 1 and 3 the advantages of my invention are attained by positioning the retaining members 33 on the side of the cover member which is opposed from that constituting the leading surface when the cover is flexed away from the wheel structure either by manual manipulation to obtain access to the rear side thereof or by lateral expansion of the tire 17 during use. It will also be seen that in these constructions the outer surface of the body part 12 of the wheel structure extends radially inwardly and axially outwardly with a gradual, smooth curvature thus presenting no obstructions which extend into the range of movement of the cover member during the aforementioned flexing operations. Thus axial outward, radial inward movement of the outer periphery of the cover member results in a slight, well distributed flexure of the entire cross-section of the cover member, the flexing action taking part largely by virtue of pivotal movement of the inner peripheral bead 28 relative to the retaining flanges 33 and the engaged portion of the outer surface of the body part 12. Thus no severe, fatiguing, bending strains are concentrated at a localized portion of the cover member. In this manner the life of the cover member is preserved throughout the constant flexing action to which it is subjected.

In the construction shown in Figure 4, the cover member 39 is provided with an outer peripheral portion 40 constructed similar to that of the cover member 36 shown in Figure 3. As in the previously described structure, the cover member 39 extends radially inwardly over the wheel structure to a part disposed inwardly of the junction between the tire rim 10 and the central body part 12, however, there is here provided an integral portion 41 which affords in effect, an ornamental cover for a radially inner portion of the body part 12 of the wheel structure and also provides for radially inner anchorage of the cover member 39 about which the radially outer part thereof may be flexed.

As will be seen from Figure 4, the cross-sectionally convex, radially outer part of the cover member 39 is joined with the inner portion 41 to comprise an integral unit, this junction comprising a circular rib 42 which extends behind the humps 34 of the retaining flanges 33 to afford intermediate attachment of the cover unit to the wheel structure, the radially inner portion 41 thereof being arranged to overlie the outer surface of the adjacent portion of the body part 12 and to be secured thereto by compression of the radially outer extremity 43 of a hub cap simulating member 44 which is secured to the wheel structure in any suitable manner such as, for instance, in the manner disclosed in connection with Figure 1.

From the foregoing it will be seen that the cover 39, being elastically, resiliently flexible as hereinbefore described, may be attached to the wheel structure by axial inward movement thereof during which the rib 42 overrides the humps 34 of the flanges 33 to be ultimately lodged at the substantially axially inner faces thereof in retaining engagement therewith.

During flexure of the radially outer part of the cover 39 it will be seen that the bending stresses imposed are distributed largely over the entire body of the cross-sectionally arcuate part of the cover member since the bead 42 represents an integral junction with the portion 41 which is so arranged that the respective parts of the cover are initially disposed in substantially their flexed position. In other words, the relationship of the integral annular parts of the cover member 39, when in a position shown in Figure 4, is such, due to the integral junction rib 42, that bending stresses imposed during flexure are distributed between the radially outer part of the cover 39 and to a minimum degree, by the bead or rib 42.

As will be seen from the dotted lines in Figure 4, the cover 39 is retained upon the wheel structure during flexure by the anchored integral part 41 thereof and further by the engagement of the retaining flanges 33 against the inner surface thereof. Furthermore it will be seen by virtue of the flexing operation the bending stresses are imposed generally throughout the body of the radially outer portion of the cover while the bead 42 comprising the junction with the portion 41 thereof is only slightly flexed and thus severe bending strains are not localized at this junction of the parts. It will also be noted that the arrangement provided is such that no obstructing parts of the retaining means or the wheel structure are encountered by the outer surface of the flexing portion of the cover member within the desired range of flexure thereof and for this reason also the localization of severe bending forces is avoided.

From the foregoing it will be seen that there is provided herein an improved cover assembly and retaining means therefor in which the retaining means may be adapted to wheel structures of varying dimensions by adjustments that may be performed quickly and easily. Furthermore the cover member may be resiliently flexed throughout the desired range to render the rear side thereof accessible and to accommodate lateral expansion of the tire on the wheel structure, this flexure and the resulting bending strains thereof being distributed throughout the cover member to prevent localization thereof at concentrated points of the cover member.

In connection with the construction shown in Figure 4 it will be seen that the cover member is so arranged that an integral part thereof is secured in surface engagement with the outer side of the body part 12 of the wheel structure so that flexure of the tire rim concealing portion occurs about this integral portion 41 which is anchored to the wheel. It will likewise be understood that his principle of operatively securing a concealing cover or flap may be utilized in connection with any part of the surface of a vehicle. This construction, in its broader aspects, is highly advantageous in that the resiliently flexible cover may be secured to any part of the surface of the vehicle for temporary movement away from that surface without requiring the utilization of hinges or the like which are found to present manifold construction problems. This is particularly the case in the event that the attached, integral portion of the flap or cover is bonded to the appropriate surface of the vehicle. Under these conditions the temporary flexure of the flap portion of the assembly is accomplished by movement thereof about the integral part which is secured to the surface of the vehicle. Thus it will be seen that while the desired concealment or ornamentation is attained, the structure utilized is of extreme simplicity and may be operated with great facility since mere release of the flap or cover portion results in movement thereof to its normal concealing or covering position.

What I claim is:

1. In a wheel structure including a tire rim and a central load bearing portion, said tire rim having a radially inwardly curled edge portion, there being circumferentially spaced apertures at the junction of said rim with said load bearing portion, retaining means for securing a circular cover member over the outer side of the wheel structure, said retaining means including a part for retainingly engaging the cover member and including extensible and contractible parts, one of which is arranged to be retainingly lodged at the radially inner part of the curled edge portion of the tire rim and the other part being arranged to be retainingly engaged in one of said apertures so that the retaining means wedgingly bridges the space between said curled edge portion of the tire rim and said aperture in attached relationship to the wheel.

2. The structure of claim 1 further characterized by a wheel cover portion extending radially and axially inwardly from said curled edge portion to said load bearing portion to conceal said retaining means and having an edge snapped under said retaining part.

3. In a cover structure for a wheel including a multi-flanged rim part and a load bearing part, a wheel cover including an annular portion for disposition over exposed outer side flanges of the rim part, and cover retaining means wedgingly engaged between two points on the wheel, said means being adjustable to different fixed lengths to accommodate variations in the distances separating said points and having a portion retainingly engaging said annular cover portion for retention thereof on said wheel.

GEORGE ALBERT LYON.